United States Patent
Memmen et al.

(10) Patent No.: US 9,643,281 B1
(45) Date of Patent: May 9, 2017

(54) PROCESS OF FORMING A METAL PART FROM A METAL POWDER USING A LASER TO MELT THE METAL POWDER OVER A SUPPORT SURFACE THAT CAN BE EASILY REMOVED AFTER THE METAL PART HAS BEEN FORMED

(71) Applicants: Robert L Memmen, Stuart, FL (US); Alex Pinera, Jupiter, FL (US)

(72) Inventors: Robert L Memmen, Stuart, FL (US); Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 14/991,469

(22) Filed: Jan. 8, 2016

(51) Int. Cl.
*B23K 26/342* (2014.01)
*B23K 26/144* (2014.01)
*B23K 26/142* (2014.01)
*B23K 26/70* (2014.01)
*B33Y 10/00* (2015.01)
*B33Y 40/00* (2015.01)

(52) U.S. Cl.
CPC .......... *B23K 26/342* (2015.10); *B23K 26/142* (2015.10); *B23K 26/144* (2015.10); *B23K 26/70* (2015.10); *B33Y 10/00* (2014.12); *B33Y 40/00* (2014.12)

(58) Field of Classification Search
CPC .................................. B33Y 10/00; B33Y 30/00
See application file for complete search history.

(56) References Cited

U.S. PATENT DOCUMENTS

| | | | |
|---|---|---|---|
| 2011/0190904 A1* | 8/2011 | Lechmann | A61B 17/7208 623/23.61 |
| 2014/0303942 A1* | 10/2014 | Wighton | B29C 67/0092 703/1 |
| 2015/0050463 A1* | 2/2015 | Nakano | B33Y 50/02 428/192 |
| 2015/0224743 A1* | 8/2015 | Schick | B32B 15/00 428/615 |
| 2015/0258705 A1* | 9/2015 | Hirata | B29C 67/0081 428/210 |
| 2016/0001365 A1* | 1/2016 | Blanchet | G05B 19/4097 428/172 |
| 2016/0009039 A1* | 1/2016 | Blanchet | B22F 3/1055 249/187.1 |
| 2016/0032766 A1* | 2/2016 | Bunker | B23K 26/34 165/170 |
| 2016/0175932 A1* | 6/2016 | Dimter | B22F 3/1055 419/28 |
| 2016/0221264 A1* | 8/2016 | Doherty | B29C 67/0077 |
| 2016/0229127 A1* | 8/2016 | Halliday | B29C 67/0092 |
| 2016/0236277 A1* | 8/2016 | Doherty | B22F 3/1055 |

* cited by examiner

*Primary Examiner* — Geoffrey S Evans
(74) *Attorney, Agent, or Firm* — John Ryznic

(57) ABSTRACT

A process of forming a metal part from a metal powder using a laser to melt the metal powder, where a complex part can be formed in which a support structure is formed from lightly bonding metal powder together without melting so that a support structure can be formed, or melting metal powder to form thin ligaments capable of forming a support layer within the metal powder that can be easily broken away when the metal part is finished. The lightly bonded support layer of metal powder can be formed using a ceramic slurry or controlling the laser power or speed so that the metal powder is not melted but lightly bonded together.

1 Claim, 2 Drawing Sheets

PROCESS OF FORMING A METAL PART FROM A METAL POWDER USING A LASER TO MELT THE METAL POWDER OVER A SUPPORT SURFACE THAT CAN BE EASILY REMOVED AFTER THE METAL PART HAS BEEN FORMED

Process of forming a metal part from a metal powder using a laser to melt the metal powder over a support surface that can be easily removed after the metal part has been formed.

CROSS-REFERENCE TO RELATED APPLICATIONS

None.

GOVERNMENT LICENSE RIGHTS

None.

BACKGROUND OF THE INVENTION

Field of the Invention

The present invention relates generally to a part and a process of forming a part using a powder bed binding process in which a support structure for the powder bed is easily removable after the part has been fabricated.

Description of the Related Art Including Information Disclosed Under 37 CFR 1.97 and 1.98

Direct metal laser sintering (DMLS) is an additive manufacturing technique that uses a Yb (Ytterbium) fibre laser fired into a bed of powdered metal, aiming the laser automatically at points in space defined by a 3D model, melting or rather, welding the material together to create a solid structure.

The DMLS process involves use of a 3D CAD model to properly orient the geometry for part building and adds supports structure as appropriate. The DMLS machine uses a high-powered 200 watt Yb-fiber optic laser. Inside the build chamber area, there is a material dispensing platform and a build platform along with a recoater blade used to move new powder over the build platform. The technology fuses metal powder into a solid part by melting it locally using the focused laser beam. Parts are built up additively layer by layer, typically using layers 20 micrometers thick. This process allows for highly complex geometries to be created directly from the 3D CAD data, fully automatically, in a relatively short time and without any tooling. DMLS is a net-shape process, producing parts with high accuracy and detail resolution, good surface quality and excellent mechanical properties.

DMLS has many benefits over traditional manufacturing techniques. The ability to quickly produce a unique part is the most obvious because no special tooling is required and parts can be built in a matter of hours. Additionally, DMLS allows for more rigorous testing of prototypes. Since DMLS can use most alloys, prototypes can now be functional hardware made out of the same material as production components.

DMLS is also one of the few additive manufacturing technologies being used in production. Since the components are built layer by layer, it is possible to design internal features and passages that could not be cast or otherwise machined. Complex geometries and assemblies with multiple components can be simplified to fewer parts with a more cost effective assembly. DMLS does not require special tooling like castings, so it is convenient for short production runs.

Currently, when powder bed laser melting is employed to fabricate complex parts, a support structure (for the metal powder) must be built along with the part to ensure that the finished part conforms to the dimensions required. Since the support structure is often an impediment to the final operation of the finished part, the support structure must be removed prior to the part being functional. With some geometries the removal is not currently possible and this precludes using this fabrication technique.

The process of high energy powder bed fabrication of parts often requires the addition of support structure to the fabrication to prevent drooping or mal-forming of the structure due to lack of support in overhung areas. After placement, these supports must be removed by mechanical means prior to putting the part in service. The potential inability to remove these support structures from hidden surfaces precludes the use of this fabrication technique for some configurations thus limiting its usefulness.

BRIEF SUMMARY OF THE INVENTION

The present invention combines two different fabrication techniques (Direct Laser Melting and Powder Bed Binding) into one in order to fabricate complex structures with easily dismantled supports. The supports are required in order to form the desired shape and preclude sagging or drooping of the structure while it is weak and close to the insipient melt temperature during fabrication.

The present invention also relates to how to fabricate support structures that will provide the needed lift during fabrication but be more easily removed by mechanical means such as striking or vibration after fabrication.

DETAILED DESCRIPTION OF THE INVENTION

Figure 3:
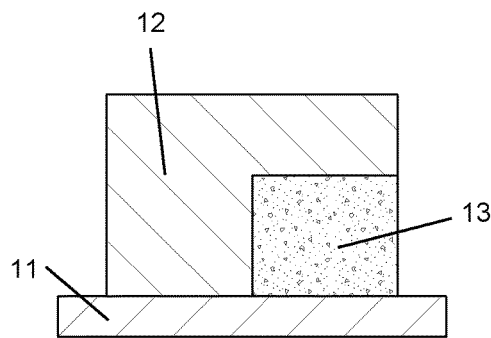
FIG. 3 shows a cross section view of a metal part being formed with an overhanging section that is supported by the support section formed of lightly bonded together metal powder of the present invention.

By combining the processes of DLM and Powder Bed Binding into one part building machine, an integral support structure is fabricated while the part is being built. The process works as follows. The first step is to spread the desired powder which forms the construct on a platen and then pass a print head over the platen emitting the binder material selectively where desired to form a subsequent support structure. The binder material does not melt the powder together but binds (glues) the powder so that a support structure is formed for subsequent layers of loose powder to be deposited. The print head retracts to a parked position and the laser then traces the pattern which forms the construct while the previously "glued" powder provides the required support till the construct cools. The binder material must be capable of withstanding the high temperatures required to melt the metal powder that is supported on top of the "glued" powder support structure. With this approach the required support structure is formed along with the desired part but unlike the existing process the support is not an integral member of the part requiring high energy removal techniques. The process proceeds as a conventional DLM process, layer by layer but with the added step of after each layer of powder is deposited, binder is applied discreetly where needed.

After the fabrication is complete the part is removed from the build chamber and post processed to remove the support structure. Depending on the binder used for the support structure the removal could entail a chemical process or heat or mechanical means such as vibration or impact. Whatever is required to break the bond between the powder and binder material but not harm the finished part.

The present invention also relates to how to fabricate support structures that will provide the needed lift during fabrication but be more easily removed by mechanical means such as striking or vibration after fabrication.

Laser and Electron Beam powder bed manufactured parts require support structures when features are to be overhung in the build direction. After completion of the build these support structures must be removed by machining because they are welded to the structure. This removal could be more easily accomplished if the support portion were sintered or lightly joined rather than welded. This could be accomplished by either reducing the energy to the laser beam or moving the laser beam at a higher rate of speed or both to merely join the powder particles in the support structure sufficiently to provide support but not be completely fused as in welding. The beam intensity would be modulated to weld where needed for the final part and sintered where needed for the support.

Since the powder in the support is lightly joined it is more easily removed by mechanical means that if the support were a welded structure. It is important that the support be sufficiently joined to provide the needed resistance to the welded portion drooping or dropping during fabrication but not sufficiently bonded to preclude easy removal. In addition to modulating the power to the beam when being applied to the support structure, the beam could also be interrupted to provide regions of unsintered powder but still provide the support required. An additional embodiment would be to fabricate the support with a very thin ligament between the support structure and the part such that they could more easily be separated by mechanical means.

After the fabrication is complete, the lightly joined support structure would be removed from the final part by mechanically striking the support to break it loose or through means of mechanical vibration of the part to separate the lightly joined support from the structure. Because of this non line of sight removal technique support structure could be added to regions not accessible by conventional machining.

Figure 1:
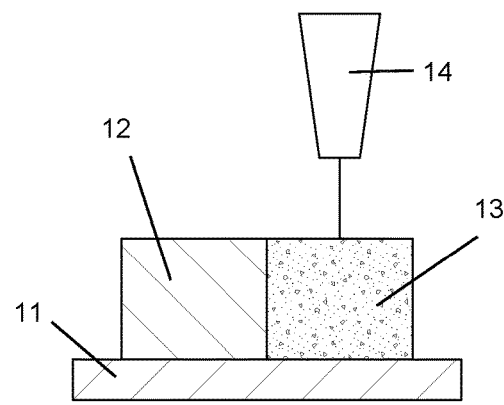
FIG. 1 shows a cross section view of a metal part being formed from the melting of certain layers of metal powder by a laser of the present invention.

A complex part is formed by depositing thin layers of a metal powder on to a support surface such as a platen 11 as seen in FIG. 1 and welding or melting certain areas of the powder to form the part. After one layer has been deposited and then melted, a second and subsequent layer is deposited and selectively melted until the part is complete. FIG. 1 shows these layers of powder deposited on the platen 11 with the left side being welded together to form a section of the part while the loose powder on the right is left loose and not welded or fused together.

Figure 2:
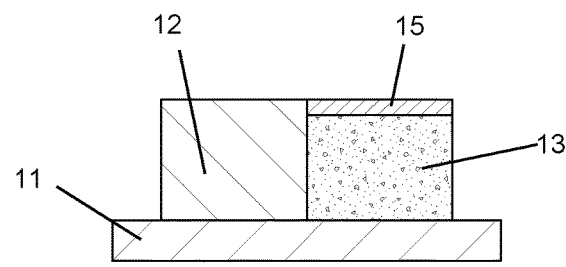
FIG. 2 shows a cross section view of a metal part being formed with a support layer over unmelted metal powder that additional layers of metal powder can be deposited and then melted of the present invention.
Figure 4:
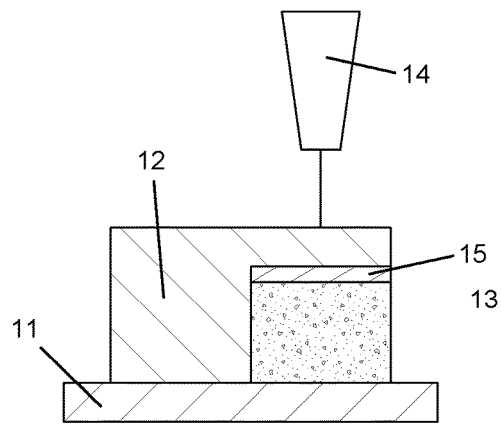
FIG. 4 shows a cross section view of a metal part being formed with an overhanging section that is supported by the support section formed of lightly bonded together metal powder using a ceramic slurry of the present invention.

When an overhanging section of the part is to be formed like that shown in FIG. 3, the loose powder located below this overhung section must be glued or bonded together to form a support structure capable of supporting the metal powder without drooping. Thus, a print head 14 discharges a binder material onto the loose powder that will form a support structure 15 as seen in FIG. 2 on which additional layers of loose powder can be deposited and then melted to form the overhung section of the part shown in FIG. 3. This binder material can be a ceramic slurry deposited like that of an ink jet printer in which the ceramic slurry is capable of withstanding the high melting temperature of the metal powder that forms the section of the part supported by the sintered or lightly joined powder. FIG. 4 shows the additional layers of metal powder being deposited on to the support surface 15 that is then welded to form the overhung section of the part being fabricated.

Once the part has been completed, the loose powder and the sintered powder can be more easily removed by vibrating or mechanical striking of the support structure to break the support structure loose from the finished part.

Figure 5:
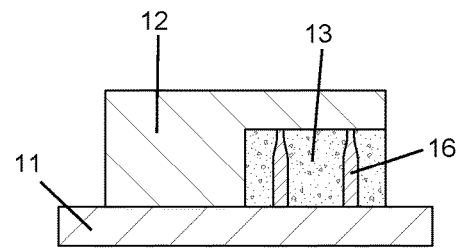
FIG. 5 shows a cross section view of a metal part being formed with an overhanging section that is supported by the support section formed of thin ligaments formed within the metal powder of the present invention.
Figure 6:
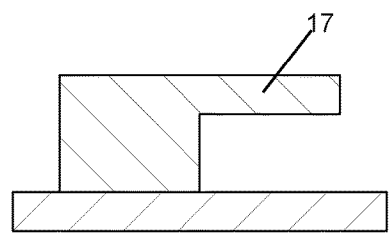
FIG. 6 shows a cross section view of the metal part formed with the support section removed of the present invention.

In another embodiment of the present invention, FIG. 5 shows the support structure to be formed by melting certain sections of the loose metal powder to form a very thin ligament 16 within the loose powder that forms a support for the metal powder that will be melted to form the overhung section of the part. These thin ligaments 16 extend from the platen and up to a location where the overhung section of the part will be formed. At the tip of the thin ligaments where the support structure will be formed, the thin ligaments are formed very thin so that the ligaments can be easily broken away from the finished part. The ligaments are formed close enough together in the loose metal powder bed so that the loose powder between adjacent ligaments will not droop or shift when the laser is melting the powder to form the overhung section of the part. FIG. 6 shows the part formed from melting the metal powder with the overhung section 17 with the loose powder and support structure removed.

Thus, the present invention forms a support structure capable of supporting the loose metal powder that is to be melted by a laser to form a complex metallic part in which the support structure can form a thin ligament in which the section of the ligament that attaches to the finished part is very thin so that the support structure can be easily broken away from the finished part surface. In the lightly bonded support structure, the metal powder is lightly bonded together by a lower powered laser so that the powder is not melted together but lightly bonded together such that it can be broken away. Or, the laser can melt small sections of the metal powder with loose powder in-between that will be close enough together so that drooping of the loose powder does not occur yet the melted powder support can be easily broken away from the finished part.

With the DLM and powder bed binding process of the present invention, a complex part such as a volute for a pump can be formed using a laser to weld metal powder particles together to form the part with the passages formed therein. The support structure can easily be removed from internal sections of the finished part by chemical leaching or vibration or mechanical striking to break these pieces away.

We claim the following:

1. A process for manufacturing a metal part from a metal powder using a laser to melt the metal powder comprising the steps of:

depositing layers of metal powder on to a platen;

using a laser to melt certain areas of the metal powder to form a section of the metal part;

lightly bonding together certain areas of layers of metal powder to form a support surface for an overhanging section of the metal part dispensing a slurry of ceramic material capable of withstanding a melting temperature of the metal powder being supported by the ceramic slurry to form the support surface for the overhanging section of the metal part;

depositing additional layers of metal powder over the support surface;

using the laser to melt certain areas of layers of the metal powder supported on the support surface to form an overhanging section of the metal part; and, removing any unmelted metal powder and the support surface from the metal part.

* * * * *